(12) United States Patent
Bickhart (10) Patent No.: US 10,142,223 B2
(45) Date of Patent: Nov. 27, 2018

(54) SYMMETRIC INTERSUBNET TRAFFIC LOAD BALANCING IN MULTIHOMED NETWORKS

(71) Applicant: Juniper Networks, Inc., Sunnyvale, CA (US)

(72) Inventor: Ryan Bickhart, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 58 days.

(21) Appl. No.: 15/278,670

(22) Filed: Sep. 28, 2016

(65) Prior Publication Data

US 2018/0091419 A1 Mar. 29, 2018

(51) Int. Cl.
*H04L 12/723* (2013.01)
*H04L 12/741* (2013.01)
*H04L 29/08* (2006.01)

(52) U.S. Cl.
CPC ............ *H04L 45/50* (2013.01); *H04L 45/745* (2013.01); *H04L 69/325* (2013.01)

(58) Field of Classification Search
CPC ......... H04L 45/00; H04L 41/08; H04L 45/50; H04L 45/745
See application file for complete search history.

(56) References Cited

U.S. PATENT DOCUMENTS

| | | | | |
|---|---|---|---|---|
| 7,136,374 B1 * | 11/2006 | Kompella | ............... | H04L 45/10 370/352 |
| 7,856,509 B1 * | 12/2010 | Kodeboyina | ........... | H04L 45/00 709/238 |
| 8,665,739 B2 * | 3/2014 | Sampath | ............... | H04L 12/413 370/250 |
| 8,948,169 B2 * | 2/2015 | Salam | .................... | H04L 45/66 370/390 |
| 9,019,814 B1 * | 4/2015 | Mohanty | ................. | H04L 45/00 370/219 |
| 9,178,816 B1 | 11/2015 | Ojha et al. | | |

(Continued)

FOREIGN PATENT DOCUMENTS

EP 3 018 866 5/2016

OTHER PUBLICATIONS

Sajassi et al., "BGP MPLS Based Ethernet VPN," https://tools.ietf.org/html/draft-ietf-l2vpn-evpn-11, Oct. 18, 2014, 53 pages.

(Continued)

*Primary Examiner* — Khaled M Kassim
*Assistant Examiner* — Syed Ali
(74) *Attorney, Agent, or Firm* — Harrity & Harrity, LLP (57) ABSTRACT

A device may receive a network address associated with a destination device. The network address may identify the destination device based on layer 3 of the Open Systems Interconnection model. The device may store next-hop information identifying a next hop associated with the destination device based on the network address. The device may generate an auto-discovery route including a layer 3 label. The layer 3 label may permit network traffic to be routed to the destination device based on multiprotocol label switching (MPLS), and may identify a lookup table based on which to obtain the next-hop information. The device may provide the auto-discovery route including the layer 3 label.

20 Claims, 6 Drawing Sheets

(56) References Cited

U.S. PATENT DOCUMENTS

| | | | |
|---|---|---|---|
| 9,832,097 B2 * | 11/2017 | Balus | H04L 12/4641 |
| 2012/0177054 A1 | 7/2012 | Pati et al. | |
| 2012/0236734 A1 * | 9/2012 | Sampath | H04L 12/413 |
| | | | 370/252 |
| 2017/0118043 A1 * | 4/2017 | Hao | H04L 12/4633 |

OTHER PUBLICATIONS

Sajassi et al., "E-VPN Ethernet Segment Route," https://tools.ietf.org/html/draft-sajassi-l2vpn-evpn-segment-route-00, Jul. 4, 2011, 15 pages.

Sajassi et al., "BGP MPLS-Based Ethernet VPN," https://tools.ietf.org/html/rfc7432, Feb. 2015, 57 pages.

Extended European Search Report corresponding to EP 16204539.7 dated Aug. 14, 2017, 8 pages.

* cited by examiner

SYMMETRIC INTERSUBNET TRAFFIC LOAD BALANCING IN MULTIHOMED NETWORKS

BACKGROUND

A network device may receive network traffic (e.g., a set of packets) for routing via a network. For example, the network device may receive the network traffic from a host network device (e.g., via one or more other network devices) for routing to a subnet of the network. The network traffic may be associated with a media access control (MAC) address associated with a MAC route. In this case, the network device may utilize an address resolution protocol (ARP) message to identify an Internet protocol (IP)/MAC binding for routing the network traffic and/or response network traffic (e.g., one or more other packets) in the network. For example, the network device may identify an IP address corresponding to the MAC route associated with the network traffic. The network device may direct the network traffic toward the subnet of the network based on determining the MAC/IP binding.

SUMMARY

A device may include one or more processors. The device may receive a plurality of route advertisements corresponding to a plurality of edge devices. The plurality of route advertisements may identify routing information to be used in connection with routing network traffic to a destination device via the plurality of edge devices. The plurality of route advertisements may include at least one auto-discovery route and at least one MAC/IP advertisement route. The at least one auto-discovery route may include one or more first layer 3 labels to be used in connection with performing multiprotocol label switching (MPLS) to route network traffic to the destination device. The at least one MAC/IP advertisement route may include one or more second layer 3 labels to be used in connection with performing MPLS to route network traffic to the destination device. The device may receive network traffic to be routed to the destination device. The device may route the network traffic toward the destination device via the plurality of edge devices based on the plurality of route advertisements.

A non-transitory computer-readable medium may store one or more instructions that, when executed by one or more processors of a first device, cause the one or more processors to receive a plurality of route advertisements corresponding to a plurality of second devices. The plurality of route advertisements may identify routing information to be used in connection with route network traffic to a destination device via the plurality of second devices. The plurality of route advertisements may include at least one auto-discovery route. The at least one auto-discovery route may include one or more respective first layer 3 labels to be used in connection with performing multiprotocol label switching (MPLS) to route network traffic to the destination device. The plurality of route advertisements may include at least one MAC/IP advertisement route. The at least one MAC/IP advertisement route may include one or more respective second layer 3 labels to be used in connection with performing MPLS to route network traffic to the destination device. The one or more first layer 3 labels and the one or more second layer 3 labels may identify respective lookup tables based on which the plurality of second devices are to identify next-hop information for the destination device. The one or more instructions, when executed by the one or more processors, may cause the one or more processors to receive network traffic to be routed to the destination device. The one or more instructions, when executed by the one or more processors, may cause the one or more processors to provide the network traffic to be routed to the destination device via the plurality of second devices based on the plurality of route advertisements.

A method may include receiving, by a device, a network address associated with a destination device. The network address may identify the destination device based on layer 3 of the Open Systems Interconnection model. The method may include storing, by the device, next-hop information identifying a next hop associated with the destination device based on the network address. The method may include generating, by the device, an auto-discovery route including a layer 3 label. The layer 3 label may permit network traffic to be routed to the destination device based on multiprotocol label switching (MPLS), and may identify a lookup table based on which to obtain the next-hop information. The method may include providing, by the device, the auto-discovery route including the layer 3 label.

DETAILED DESCRIPTION

The following detailed description of example implementations refers to the accompanying drawings. The same reference numbers in different drawings may identify the same or similar elements.

Multihoming is the practice of connecting an endpoint device, a host, or a network to more than one network. Multihoming can be useful for connecting a host or network to multiple networks in order to increase reliability, to improve performance, and/or to decrease cost. As one example, a mobile phone may be connected to a third generation (3G) network and a Wi-Fi network simultaneously. As another example, an endpoint device may be homed to multiple, different provider edge devices. Multihoming may increase reliability by providing multiple links for packets (e.g., IP packets), so that if a link fails, the packets can be routed through other links.

In some cases, a device may perform intersubnet forwarding to transmit network traffic from one network or subnet (e.g., an Ethernet virtual private network (EVPN), a virtual local area network (VLAN), etc.) to a destination network or subnet. In this case, the device may be an ingress provider edge (PE) device associated with a provider network, and may route the network traffic to one or more egress PE devices associated with the destination network or subnet.

One example of a scheme for intersubnet forwarding is Multiprotocol Label Switching (MPLS), which is a type of data-carrying technique that directs data from one network node to the next network node based on path labels rather than network addresses, thereby avoiding complex lookups in a routing table. In an MPLS scheme, the labels identify virtual links (paths) between distant nodes (e.g., PE devices) rather than endpoints.

In performing intersubnet forwarding, a device may use layer 2 labels and/or layer 3 labels to route the network traffic, where layer 2 corresponds to the data link layer of the Open Systems Interconnection (OSI) model (e.g., an Ethernet layer), and layer 3 corresponds to the network layer of the OSI model (e.g., an IP layer).

For example, a layer 2 label may be associated with one or more egress PE devices, and may identify a MAC lookup table based on which the egress PE devices(s) are to identify next-hop information, such as a last hop, for a destination endpoint device in the destination network or subnet. In this case, the layer 2 label is typically advertised using auto-discovery routes or auto-discovery route advertisements (which may be referred to in some cases as Type 1 route advertisements). Auto-discovery routes may be advertised (e.g., automatically, based on a change to network topology, etc.) by each PE device associated with the destination network or subnet.

Similarly, layer 3 labels may be associated with respective egress PE devices and may identify respective lookup tables (e.g., IP tables) based on which to identify next-hop information (e.g., a last hop) for a destination endpoint device in the destination network or subnet. In this case, the layer 3 label may be provided to the ingress PE as part of a Type 2 (MAC/IP) advertisement route, which may be advertised by one or more egress PE devices. Additionally, the MAC/IP advertisement route may also include a layer 2 label, an IP address of the destination endpoint device, and/or a MAC address of the destination endpoint device (e.g., an address resolution protocol (ARP) binding associated with the destination endpoint device).

In some implementations, intersubnet forwarding may be performed based on an asymmetric approach. To perform asymmetric intersubnet forwarding, the ingress PE device identifies a destination endpoint device based on a destination IP address associated with an IP packet en route to the destination endpoint device, and identifies a layer 2 label associated with an egress PE device corresponding to the destination endpoint device. The ingress PE device determines a destination MAC address associated with the destination IP address, and packages the IP packet in a layer 2 packet (e.g., an Ethernet packet) with the destination MAC address. The ingress PE device then packages the layer 2 packet in a MPLS packet that identifies the layer 2 label associated with the egress PE device, and routes the MPLS packet to the egress PE device.

Upon receiving the MPLS packet, the egress PE device identifies a MAC table in which to lookup the destination endpoint device based on the layer 2 label (e.g., based on different destination subnets or networks being associated with different MAC tables) and routes the network traffic to the destination endpoint device based on the destination MAC address label identified by the layer 2 packet.

In some implementations, intersubnet forwarding may be performed based on a symmetric approach. To perform symmetric intersubnet forwarding, the ingress PE device identifies a destination endpoint device based on a destination IP address associated with an IP packet en route to the destination endpoint device, and identifies a layer 3 label associated with an egress PE device corresponding to the destination endpoint device. The ingress PE device then packages the IP packet in a MPLS packet that identifies the layer 3 label associated with the egress PE device, and routes the MPLS packet to the egress PE device.

Upon receiving the MPLS packet, the egress PE device identifies a lookup table (e.g., a table identifying IP addresses and last-hop information associated with the IP addresses) in which to lookup the destination endpoint device based on the layer 3 label (e.g., based on different destination subnets or networks being associated with different IP tables) and routes the network traffic to the destination endpoint device based on the destination IP address identified by the IP packet.

In the symmetric approach, the ingress PE device typically does not package the IP packet in a layer 2 packet, and the egress PE device identifies the IP table based on the layer 3 label, which is typically carried by an MAC/IP (type 2) route advertisement and not an auto-discovery (type 1) route advertisement.

When network traffic is routed to a multihomed endpoint device, it may be advantageous to distribute the network traffic across multiple egress PE devices associated with the endpoint device (i.e., to perform load balancing of the network traffic, to improve redundancy in the network, etc.) based on labels associated with the multiple egress PE devices. This process may be referred to as aliasing.

When asymmetric intersubnet forwarding is used, load balancing for a multihomed device may be straightforward because each of the egress PE devices may transmit, to the ingress PE device, auto-discovery route advertisements (e.g., type 1 routes) that each include a layer 2 label. The layer 2 label permits the egress PE devices to perform a lookup using the appropriate MAC table identified by the layer 2 label to determine the next-hop information for endpoint device 2. In this case, the ingress PE device may package the IP network traffic in layer 2 packets, and may transmit the layer 2 packets to the egress PE devices with the layer 2 labels. Based on the layer 2 labels, the egress PE devices may provide the IP network traffic to the destination endpoint device. In this way, a multihomed endpoint device may achieve load balancing using asymmetric intersubnet forwarding.

When symmetric intersubnet forwarding is used to forward network traffic of IP packets, however, load balancing for a multihomed device may be more difficult. In this case, the auto-discovery (type 1) routes advertised by the egress PE devices, other than the designated forwarding egress PE device, may not include the layer 3 label that is needed by the egress PE devices to identify the IP table based on which to forward the network traffic to the destination endpoint device. Furthermore, the IP packet is not packaged in a layer 2 packet, so the MAC address associated with the destination endpoint device is not identified by the IP packet. This prevents the egress PE devices from using the layer 2 labels included in the auto-discovery routes to route the IP packet to the destination endpoint device. Therefore, when the ingress PE device provides an IP packet with a layer 2 label (e.g., rather than a layer 3 label), the egress PE devices may be incapable of properly forwarding the network traffic to the destination endpoint device.

Implementations described herein enable a multihomed network associated with multiple egress PE devices to perform symmetric intersubnet forwarding of IP packets via the multiple egress PE devices. The multiple egress PE devices may each provide a layer 3 label (e.g., in an auto-discovery (type 1) route) to an ingress PE device.

As one example of providing the layer 3 label, an egress PE device may include the layer 3 label in a payload of a route (e.g., an auto-discovery (type 1) route), such as by modifying one or more fields of network layer reachability information (NLRI) of the route. In this way, the egress PE device improves efficiency of providing the layer 3 label. As another example of providing the layer 3 label, the egress PE device may append the layer 3 label to an auto-discovery (type 1) route as an extended community attribute, such as a Border Gateway Protocol (BGP) extended community attribute. In this way, the egress PE device improves backward compatibility of the route. For example, when a device is not configured to understand or process extended community attributes, the device may forward the route without modifying the extended community attributes.

Based on receiving the layer 3 labels from the multiple egress PE devices, the ingress PE device may route network traffic to a destination endpoint device via the multiple egress PE devices using standard MPLS procedures, and the multiple egress PE devices may utilize the layer 3 label to identify a last hop to the destination endpoint device based on a lookup table and using the IP address identified by the network traffic. In this way, load balancing (by redundant provision of network traffic) may be achieved when performing symmetric intersubnet forwarding in a multihomed network.

Figure 1A:
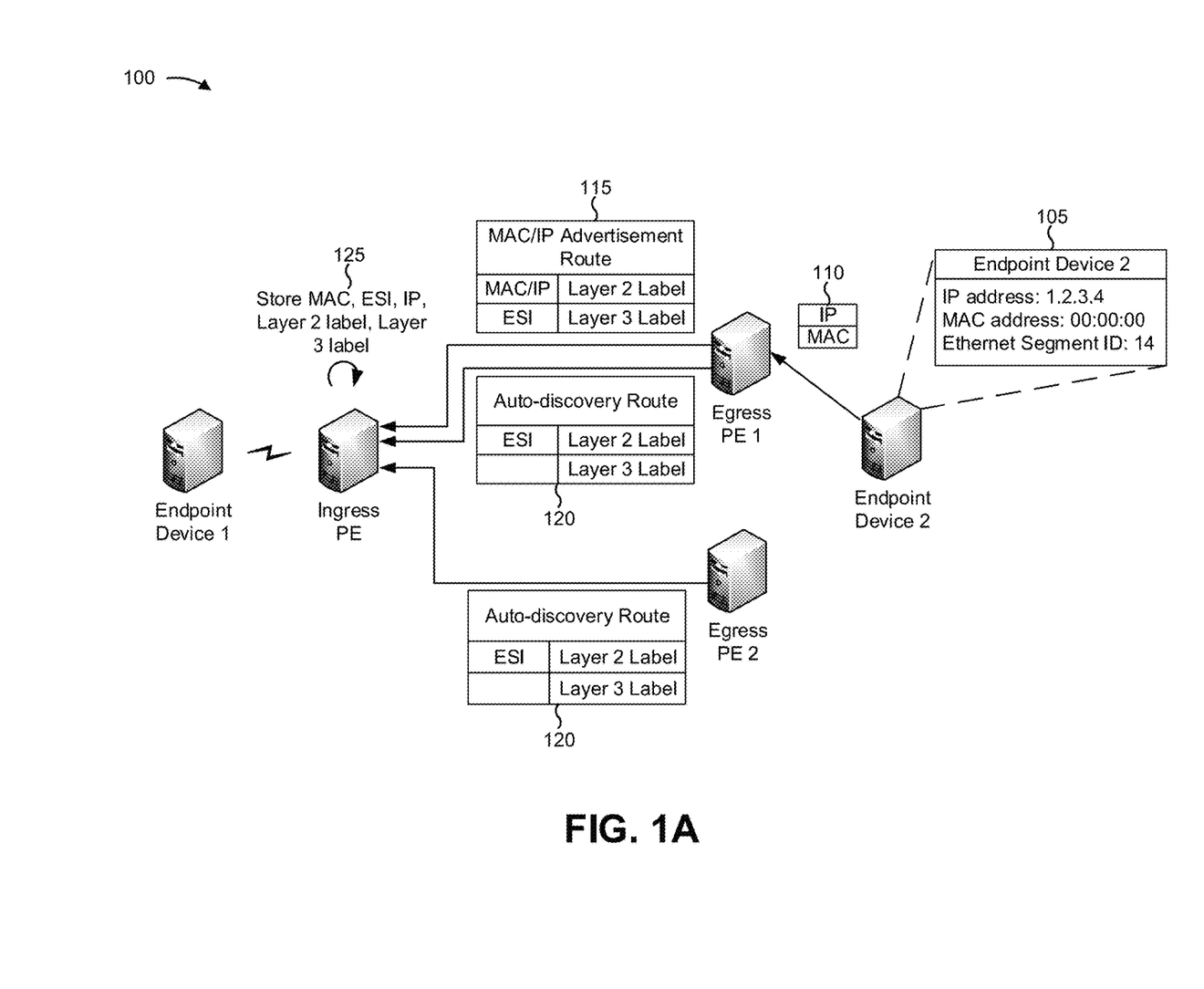
FIGS. 1A and 1B are diagrams of an overview of an example implementation described herein.
Figure 1B:
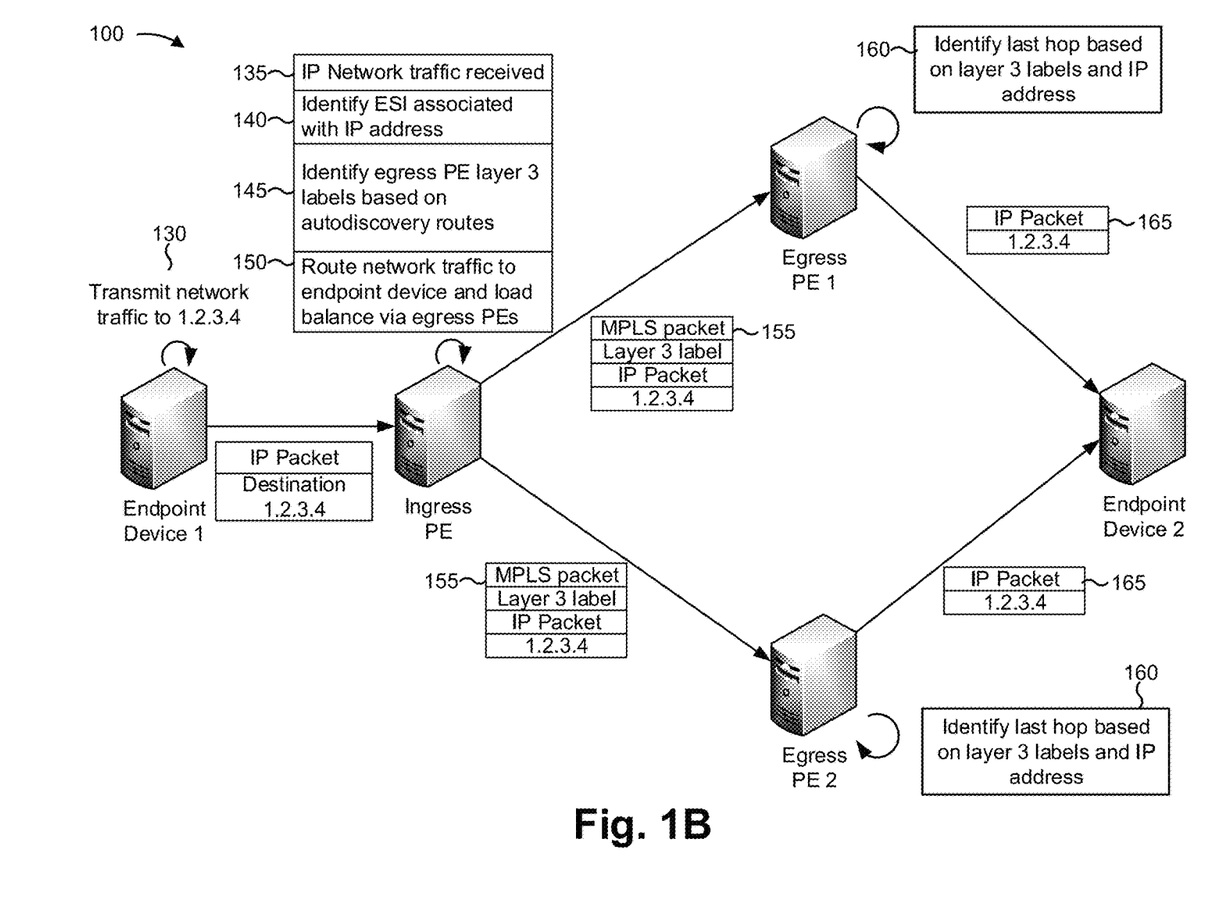

FIGS. 1A and 1B are diagrams of an overview of an example implementation 100 described herein. As shown in FIG. 1A, example implementation 100 may include an endpoint device 1 and an endpoint device 2. In some implementations, endpoint device 1 and endpoint device 2 may be customer edge devices (CEs) of one or more customer networks. Example implementation 100 may further include an ingress PE device and multiple egress PE devices (egress PE 1 and egress PE 2). The ingress PE device and egress PE devices may be associated with one or more provider networks. The multiple egress PE devices may be associated with endpoint device 2 based on endpoint device 2 being multihomed to provider networks that each include one of the egress PE devices.

As shown by reference number 105, endpoint device 2 may be associated with an IP address, a MAC address, and an Ethernet segment identifier (ESI). As shown by reference number 110, endpoint device 2 may provide the IP address, the MAC address, and the ESI to egress PE 1 and to egress PE 2. For this reason, as shown by reference number 115, egress PE 1 may advertise a MAC/IP advertisement route. The MAC/IP advertisement route may include the IP address, the MAC address, and the ESI associated with endpoint device 2, a layer 2 (e.g., Ethernet) label, and a layer 3 (e.g., IP) label. For example, egress PE 1 and egress PE 2 may be configured with the ESI of endpoint device 2, and may provide the ESI of endpoint device 2 as part of route advertisements associated with endpoint device 2.

As shown by reference number 120, egress PE 1 and egress PE 2 may each advertise an auto-discovery route. The auto-discovery route for each egress PE device may include the ESI associated with endpoint device 2, the layer 2 label for the corresponding egress PE device, and the layer 3 label for the corresponding egress PE device. As will be discussed further herein, including the layer 3 label in the auto-discovery routes from both egress PE devices allows the layer 3 labels to be utilized to achieve load balancing across the egress PE devices when symmetric intersubnet forwarding is used. In some implementations, egress PE 1 may not transmit an auto-discovery route. For example, egress PE 1 may only transmit a MAC/IP advertisement route.

As shown by reference number 125, the ingress PE device may store the MAC address, the IP address, the ESI, the layer 2 label, and the layer 3 label. For example, the ingress PE device may store the MAC address, the IP address, the ESI, the layer 2 label, and the layer 3 label associated with egress PE 1 based on the MAC/IP advertisement route. The ingress PE device may further store the ESI, the layer 2 labels, and the layer 3 labels associated with egress PE 1 and egress PE 2 based on the auto-discovery routes.

As shown in FIG. 1B, and as shown by reference number 130, endpoint device 1 may transmit network traffic to an IP address (1.2.3.4) which is the IP address of endpoint device 2. In this case, endpoint device 1 may provide, to the ingress PE device, IP packets having the IP address 1.2.3.4 as the destination address.

As shown by reference number 135, the ingress PE device may receive the network traffic. As shown by reference number 140, the ingress PE device may identify an ESI associated with the IP address (e.g., based on routing information associated with the IP address and/or based on the MAC/IP advertisement route received from egress PE device 2). As shown by reference number 145, the ingress PE device may identify layer 3 labels of multiple egress PE devices (e.g., egress PE 1 and egress PE 2) based on the auto-discovery routes. As shown by reference number 150, the ingress PE device may route the network traffic to endpoint device 2 via the multiple egress PE devices to achieve load balancing. For example, the ingress PE device may route a first portion of the IP packets of the network traffic to egress PE 1, and may route a second, different portion of the IP packets of the network traffic to egress PE 2.

As shown by reference number 155, to route the network traffic, the ingress PE device may encapsulate the IP packets in MPLS packets, which may then be routed based on MPLS processes. As shown by reference number 160, egress PE 1 and egress PE 2 each may identify next-hop information (e.g., a last hop) based on the layer 3 labels and IP addresses. Based on the egress PE devices having advertised the layer 3 label in the auto-discovery routes, the ingress PE device has been enabled to provide the layer 3 label to both egress PE devices, which allows both egress PE 1 and egress PE 2 to identify the last hop. As a result, load balancing is achieved when symmetric intersubnet forwarding is used.

As indicated above, FIGS. 1A and 1B are provided merely as an example. Other examples are possible and may differ from what was described with regard to FIGS. 1A and 1B.

Figure 2:
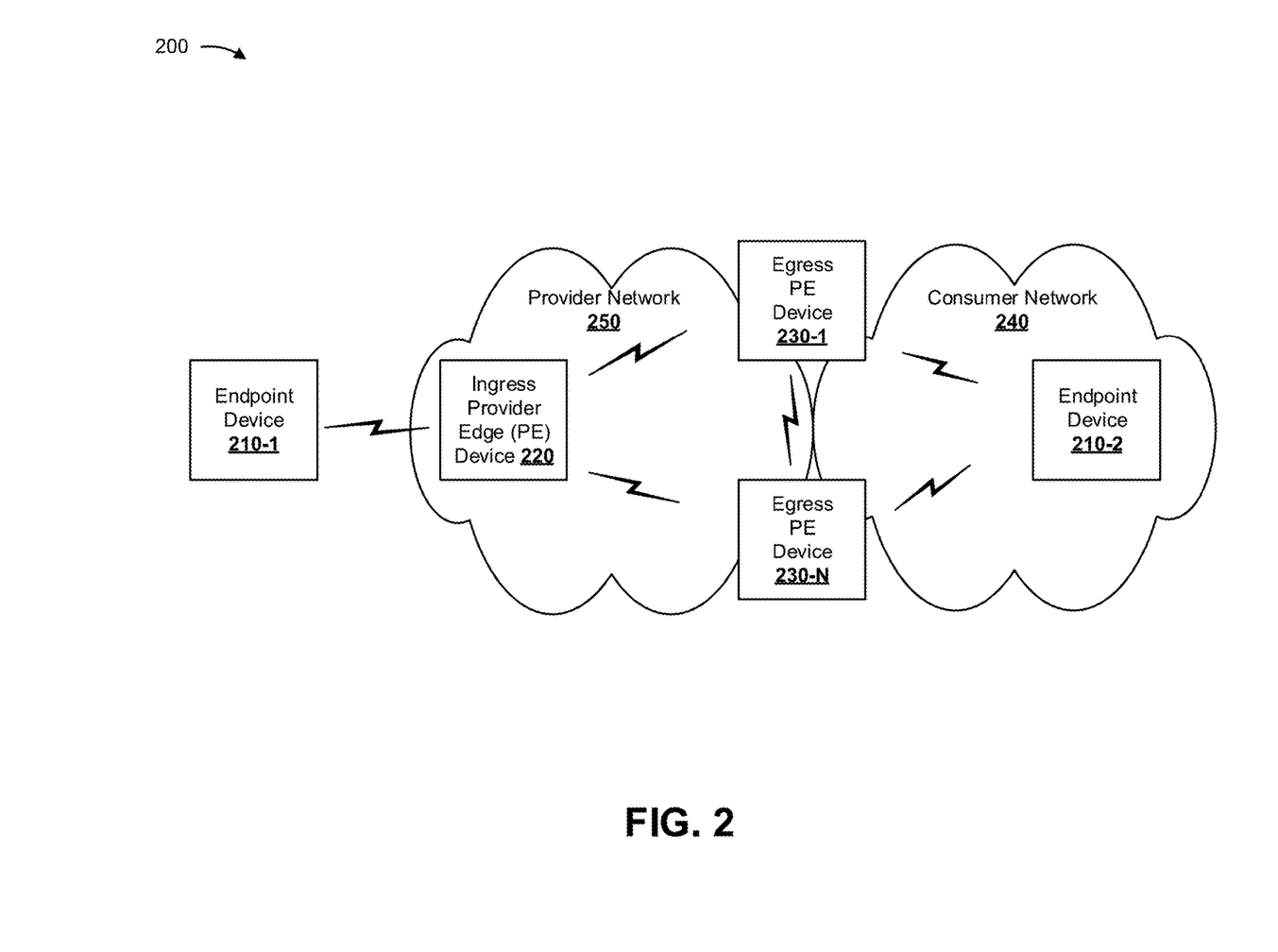
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include endpoint devices 210-1 and 210-2, an ingress provider edge (PE) device 220, one or more egress PE devices 230-1 through 230-N (N≥1) (hereinafter referred to collectively as "egress PE devices 230," and individually as "egress PE device 230"), a consumer network 240, and a provider network 250. Devices of environment 200 may interconnect via wired connections, wireless connections, or a combination of wired and wireless connections.

Endpoint device 210 includes one or more devices capable of receiving and/or providing information over a network (e.g., provider network 250), and/or capable of generating, storing, and/or processing information received and/or provided over the network. For example, endpoint device 210 may include a computing device, such as a laptop computer, a tablet computer, a handheld computer, a desktop computer, a mobile phone (e.g., a smart phone, a radiotelephone, etc.), a personal digital assistant, a network device (e.g., a router, a gateway, a firewall, a hub, a bridge, etc.), or a similar device. Endpoint device 210 may act as an endpoint (e.g., a source device and/or a destination device) for a communication with another endpoint device 210. For example, a first endpoint device 210 may provide information to a second endpoint device 210 (e.g., via consumer network 240 and/or provider network 250).

Ingress Provider edge (PE) device 220 includes one or more devices (e.g., one or more traffic transfer devices) capable of processing and/or transferring traffic between endpoint devices 210. For example, ingress provider edge device 220 may include a firewall, a router, a gateway, a switch, a hub, a bridge, a reverse proxy, a server (e.g., a proxy server), a security device, an intrusion detection device, a load balancer, or a similar type of device. In some implementations, ingress provider edge device 220 may receive traffic from endpoint device 210-1 and may provide the traffic to endpoint device 210-2 via egress PE device 230, as described elsewhere herein.

Egress PE device 230 includes one or more devices (e.g., one or more traffic transfer devices) capable of processing and/or transferring traffic between endpoint devices 210. For example, egress PE device 230 may include a firewall, a router, a gateway, a switch, a hub, a bridge, a reverse proxy, a server (e.g., a proxy server), a security device, an intrusion detection device, a load balancer, or a similar type of device. In some implementations, egress PE device 230 may receive traffic from ingress PE device 220 and may provide the traffic to endpoint device 210-2 based on next-hop information stored by egress PE device 230, as described elsewhere herein.

Consumer network 240 includes a network associated with endpoint device 210-2. For example, consumer network 240 may include a virtual local area network, a subnet, a wireless network, a wired network, a particular network segment (e.g., a group of networked devices connected to one or more network gateways), an Ethernet segment, a plurality of network segments, a plurality of Ethernet segments, or the like. In some implementations, consumer network 240 may be associated with a network segment identifier, such as an ESI or another identifier that identifies consumer network 240.

Provider network 250 includes one or more wired and/or wireless networks. For example, provider network 250 may include a multiprotocol label switching (MPLS) network, a cellular network (e.g., a long-term evolution (LTE) network, a 3G network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), an EVPN network, a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
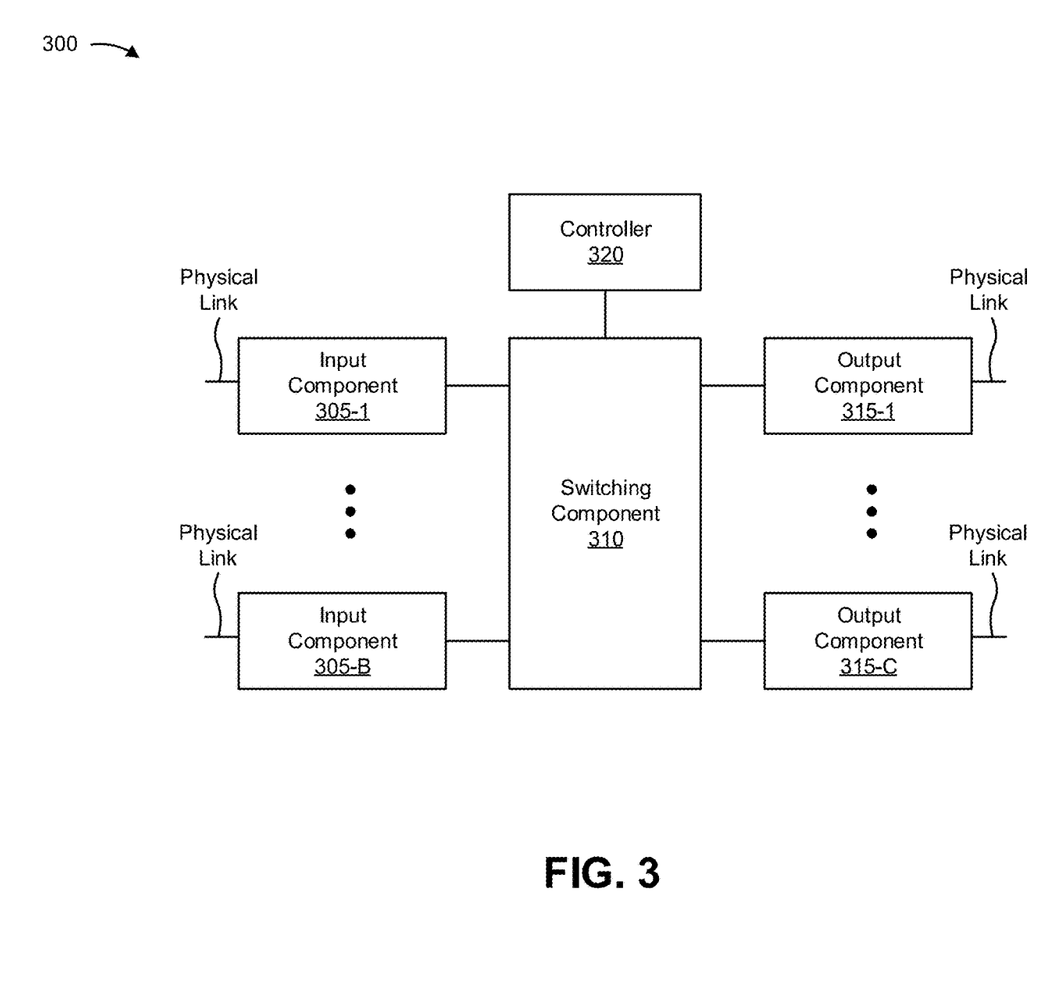
FIG. 3 is a diagram of example components of one or more devices of FIG. 2.

FIG. 3 is a diagram of example components of a device 300. Device 300 may correspond to ingress PE device 220 and/or egress PE device 230. In some implementations, ingress PE device 220 and/or egress PE device 230 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 is implemented in hardware, firmware, or a combination of hardware and software. Controller 320 includes a processor in the form of, for example, a central processing unit (CPU), a graphics processing unit (GPU), an accelerated processing unit (APU), a microprocessor, a microcontroller, a field-programmable gate array (FPGA), an application-specific integrated circuit (ASIC), and/or another type of processor that can interpret and/or execute instructions. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
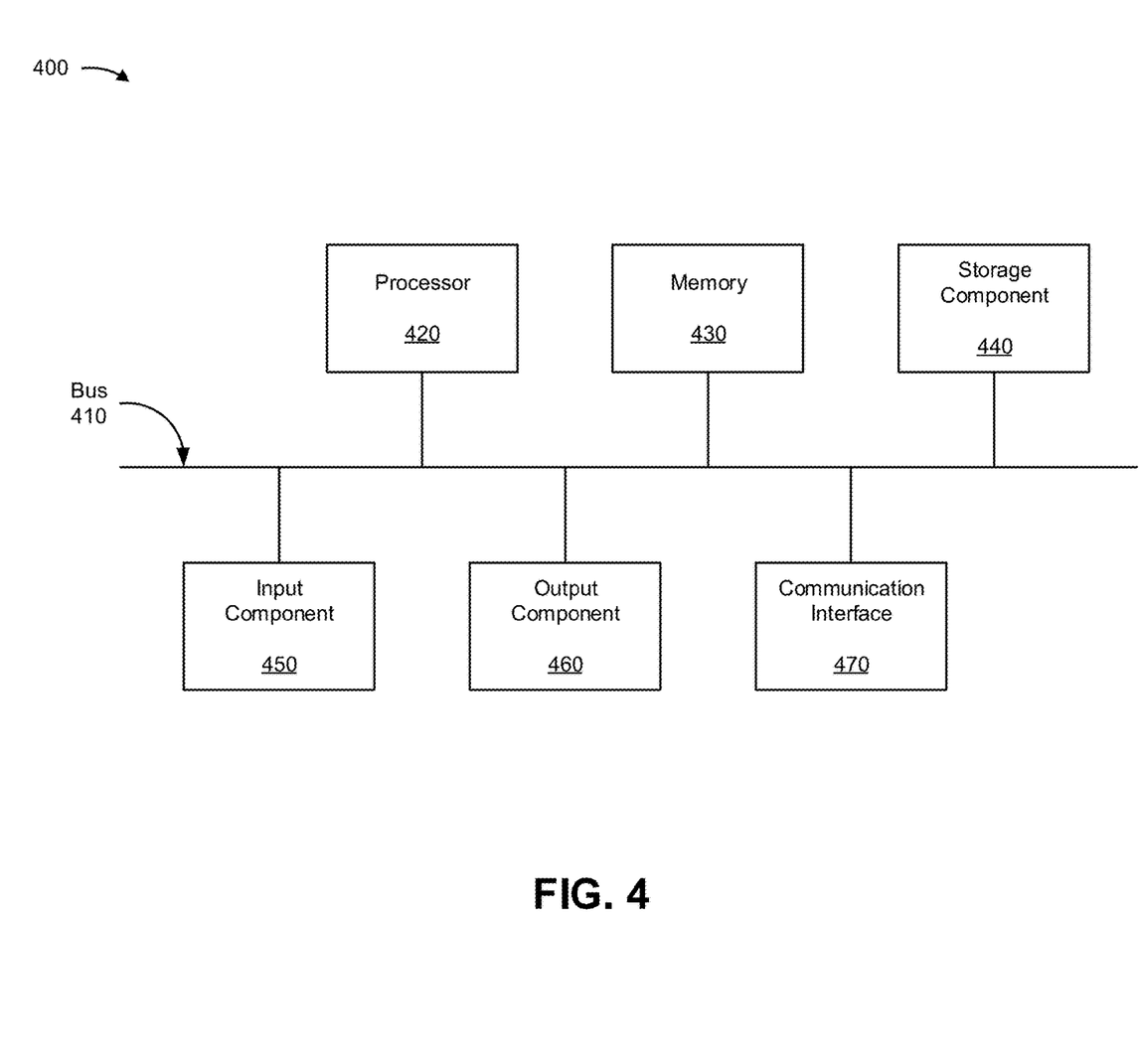
FIG. 4 is a diagram of example components of one or more devices of FIG. 2.

FIG. 4 is a diagram of example components of a device 400. Device 400 may correspond to endpoint device 210. In some implementations, endpoint device 210 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
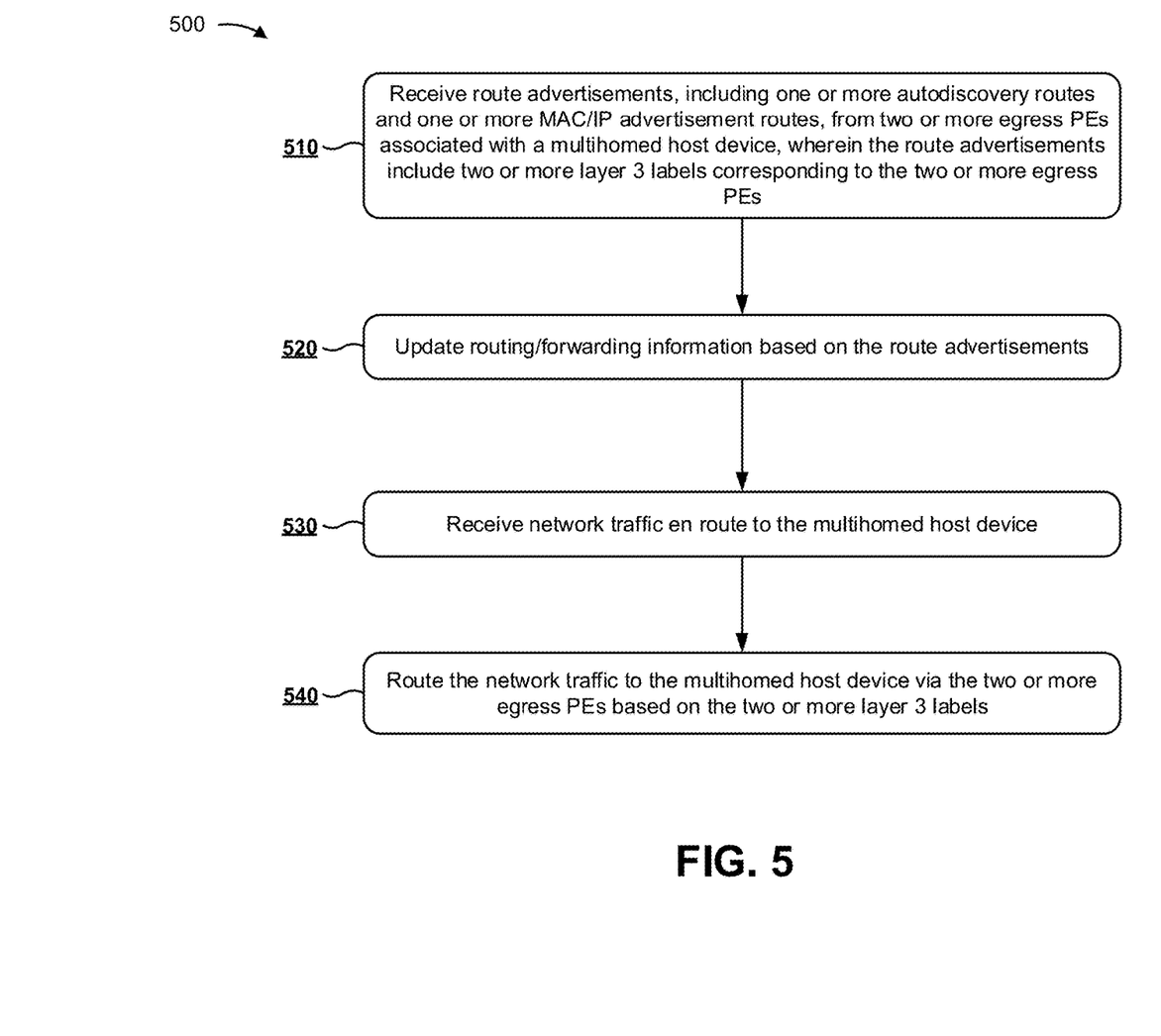
FIG. 5 is a flow chart of an example process for load balancing using symmetric intersubnet forwarding in a multihomed network.

FIG. 5 is a flow chart of an example process 500 for load balancing using symmetric intersubnet forwarding in a multihomed network. In some implementations, one or more process blocks of FIG. 5 may be performed by ingress PE device 220. In some implementations, one or more process blocks of FIG. 4 may be performed by another device or a group of devices separate from or including ingress PE device 220, such as endpoint device 210 and/or egress provider edge device 230.

As shown in FIG. 5, process 500 may include receiving two or more layer 3 labels corresponding to two or more egress PE devices, at least one of the layer 3 labels being received in association with an auto-discovery route of a corresponding egress PE device (block 510). For example, ingress PE device 220 may receive route advertisements associated with multiple, different egress PE devices 230.

In some implementations, one or more of the route advertisements may include an MAC/IP advertisement route. In this case, ingress PE device 220 may identify a layer 2 label, a layer 3 label, network addresses associated with an endpoint device 210-2, and an Ethernet subnet identifier (ESI) associated with a network or subnet of endpoint device 210-2 based on the MAC/IP advertisement route.

In some implementations, one or more of the route advertisements may include an auto-discovery route. In this case, ingress PE device 220 may identify a layer 2 label, a layer 3 label, and an ESI associated with a network or subnet of endpoint device 210-2.

By providing a layer 3 label in association with an auto-discovery route, egress PE device 230 enables load balancing across multiple, different egress PE devices 230 in a multihomed network that uses symmetric intersubnet forwarding (e.g., based on each of the multiple, different egress PE devices 230 providing a respective auto-discovery route with a respective layer 3 label).

In some implementations, the layer 2 label may identify a lookup table (e.g., a MAC table) based on which egress PE device 230 may identify next-hop information (e.g., a last hop) associated with endpoint device 210-2. For example, the layer 2 label may be associated with a route and/or a particular egress PE device 230. In this case, the layer 2 label may permit routing of packets to egress PE device 230 based on asymmetric intersubnet forwarding.

In some implementations, the layer 3 label may identify a lookup table (e.g., an IP table, such as an IPv4 table or an IPv6 table), based on which egress PE device 230 may identify next-hop information (e.g., a last hop) associated with endpoint device 210-2. For example, the layer 3 label may be associated with a route and/or a particular egress PE device 230. In this case, the layer 3 label permits routing of packets to egress PE device 230 and/or endpoint device 210-2 based on symmetric intersubnet forwarding.

In some implementations, the layer 3 label may be included in the route. For example, network layer reachability information (NLRI) associated with the two or more egress PE devices 230 may be updated to identify the layer 3 label. In this way, ingress PE device 220 conserves processor and network resources in comparison to using an extended community attribute.

As another example, the layer 3 label may be added to extended community information associated with a route. As a particular example, the layer 3 label may be added to a Border Gateway Protocol (BGP) extended community attribute. In this way, ingress PE device 220 improves backward compatibility of the auto-discovery route with the layer 3 label. For example, PE devices that are not configured to process the BGP extended community attribute may be configured to ignore the BGP extended community attribute.

As further shown in FIG. 5, process 500 may include updating routing and/or forwarding information based on the two or more layer 3 labels (block 520). For example, ingress PE device 220 may update routing and/or forwarding information based on the MAC/IP advertisement route and the one or more auto-discovery routes associated with the two or more egress PE devices 230.

In some implementations, ingress PE device 220 may store information associating the layer 3 labels with the ESI associated with endpoint device 210-2. Additionally, or alternatively, ingress PE device 220 may store information associating each egress PE device 230 with the ESI associated with endpoint device 210-2. By storing information that associates the ESI with the layer 3 labels and/or the egress PE devices 230, ingress PE device 220 facilitates load balancing for endpoint device 210-2 based on identifying the ESI associated with endpoint device 210-2.

As further shown in FIG. 5, process 500 may include receiving network traffic to be provided via at least one of the two or more egress PE devices (block 530). For example, ingress PE device 220 may receive network traffic to be provided via at least one of the two or more egress PE devices 230. In some implementations, the network traffic may identify endpoint device 210-2. For example, the network traffic may include an IP address associated with endpoint device 210-2. As another example, the network traffic may include an IP packet or another type of layer 3 packet or frame destined for endpoint device 210-2.

In some implementations, ingress PE device 220 may determine that the network traffic is to be provided via at least one of the two or more egress PE devices 230 based on the routing and/or forwarding information. For example, ingress PE device 220 may identify the ESI associated with endpoint device 210-2 based on the routing and/or forwarding information. In this case, ingress PE device 220 may identify each of the two or more egress PE devices 230 associated with the ESI, and may determine to load balance the network traffic across the two or more egress PE devices 230 based on each of the two or more egress PE devices 230 being associated with the ESI.

As further shown in FIG. 5, process 500 may include routing the network traffic via the two or more egress PE devices (block 540). For example, ingress PE device 220 may route the network traffic via each of the two or more egress PE devices 230. In some implementations, ingress PE device 220 may divide the network traffic among the two or more egress PE devices 230 evenly (e.g., half of the network traffic to a first egress PE device 230 and half of the network traffic to a second egress PE device 230). In some implementations, ingress PE device 220 may divide the network traffic based on capacities associated with each of the egress PE devices 230. For example, ingress PE device 220 may provide portions of the network traffic to each egress PE device 230 proportionate to a throughput associated with each egress PE device 230. In some implementations, ingress PE device 220 may provide a particular portion of the network traffic to be routed to endpoint device 210-2 via each of the two or more egress PE devices 230 to improve redundancy of the network traffic, which improves network performance and reduces network traffic loss in the case of an outage or another network service incident.

In some implementations, ingress PE device 220 may route the network traffic based on the layer 3 labels. For example, ingress PE device 220 may encapsulate the network traffic in packets (e.g., MPLS packets) that identify the layer 3 labels. In this case, PE devices associated with the provider network may receive the encapsulated network traffic, and may route the network traffic based on the layer 3 labels. In this way, ingress PE device 220 may permit routing of network traffic at layer 3 (e.g., the network layer, based on the IP address) rather than at layer 2 (e.g., the data link layer, based on the MAC address).

In some implementations, when egress PE device 230 receives network traffic associated with the layer 3 label, egress PE device 230 may identify a lookup table (e.g., an IP table) associated with the ESI based on the layer 3 label, and may look up an IP address of the network traffic in the IP table to identify next-hop information (e.g., a last hop). Based on the last hop, egress PE device 230 may provide the network traffic to endpoint device 210-2.

By receiving layer 3 labels (e.g., in an auto-discovery (type 1) route) from multiple egress PE devices, and by routing network traffic to a destination endpoint device via the multiple egress PE devices which may utilize the layer 3 label to identify a next hop or a last hop to the destination endpoint device, ingress PE device 220 enables load balancing to be achieved when performing symmetric intersubnet forwarding in a multihomed network.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein enable a multihomed network having multiple egress PE devices to perform symmetric intersubnet forwarding. The multiple egress PE devices may each provide a layer 3 label (e.g., in an auto-discovery (type 1) route) to an ingress PE device. For example, an egress PE device may include the layer 3 label in a payload of a route (e.g., an auto-discovery (type 1) route, such as by modifying one or more fields of the route. In this way, the egress PE device improves efficiency of providing the layer 3 label. As another example, the egress PE device may append the layer 3 label to a route (e.g., an auto-discovery (type 1) route) as a community attribute. In this way, the egress PE device improves backward compatibility of the route.

Based on receiving the layer 3 labels from the multiple egress PE devices, the ingress PE device may route network traffic to a destination endpoint device via the multiple egress PE devices, and the multiple endpoint devices may utilize the layer 3 label to identify a last hop to the destination endpoint device. In this way, load balancing (by redundant provision of network traffic) may be achieved when performing symmetric intersubnet forwarding in a multihomed network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, a packet may refer to a communication structure for communicating information, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being transmitted via a network.

As used herein, network traffic or traffic may refer to information communicated using a communication structure, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being transmitted via a network.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and one or more processors to:
receive a plurality of route advertisements corresponding to a plurality of edge devices, the plurality of route advertisements identifying routing information to be used in connection with routing network traffic to a destination device via the plurality of edge devices, and the plurality of route advertisements including at least one auto-discovery route, the at least one auto-discovery route including one or more first layer 3 labels to be used in connection with performing multiprotocol label switching (MPLS) to route the network traffic to the destination device,
the plurality of edge devices improving backward compatibility of a route and including:
the one or more first layer 3 labels in a payload of the route in an auto-discovery by modifying one or more fields of network layer reachability information (NLRI) of the route, and
an auto-discovery route extended community attribute,
the auto-discovery route extended community attribute being a Border Gateway Protocol (BGP) extended community attribute, and
the plurality of route advertisements including at least one MAC/IP advertisement route,
the at least one MAC/IP advertisement route including one or more second layer 3 labels to be used in connection with performing MPLS to route the
network traffic to the destination device;
receive the network traffic to be routed to the destination
device; and
route the network traffic toward the destination device via
the plurality of edge devices based on the plurality of
route advertisements,
the destination device being associated with a plurality
of Ethernet virtual private networks (VPNs) associated with the plurality of edge devices,
a first portion of the network traffic being forwarded to
a first edge device of the plurality of edge devices
and a second, different portion of the network traffic
being forwarded to a second edge device of the
plurality of edge devices to perform load balancing
of the network traffic,
the network traffic being divided based on capacities
associated with the first edge device and the
second edge device.

2. The device of claim 1, where the one or more first layer 3 labels and the one or more second layer 3 labels identify respective lookup tables based on which the plurality of edge devices are to identify next-hop information for the destination device.

3. The device of claim 2, where the network traffic includes an Internet Protocol (IP) address associated with the destination device; and
where the plurality of edge devices are to identify the next-hop information based on the IP address.

4. The device of claim 1, where the destination device is homed to each of the plurality of edge devices.

5. The device of claim 4, where the one or more processors are further to:
distribute the network traffic across the plurality of edge devices associated with the destination device based on labels associated with the plurality of edge devices.

6. The device of claim 1, where the one or more processors are further to:
identify two or more edge devices of the plurality of edge devices associated with an ethernet segment identifier (ESI); and
determine to load balance the network traffic across the two or more edge devices of the plurality of edge devices associated with the ESI.

7. The device of claim 1, where plurality of edge devices are egress devices.

8. A non-transitory computer-readable medium storing instructions, the instructions comprising:
one or more instructions that, when executed by one or more processors, cause the one or more processors to:
receive a plurality of route advertisements corresponding to a plurality of edge devices,
the plurality of route advertisements identifying routing information to be used in connection with routing network traffic to a destination device via the plurality of edge devices, and
the plurality of route advertisements including at least one auto-discovery route,
the at least one auto-discovery route including one or more first layer 3 labels to be used in connection with performing multiprotocol label switching (MPLS) to route the network traffic to the destination device,
the plurality of edge devices improving backward compatibility of a route and including:
the one or more first layer 3 labels in a payload of the route in an auto-discovery by modifying one or more fields of network layer reachability information (NLRI) of the route, and
an auto-discovery route extended community attribute,
the auto-discovery route extended community attribute being a Border Gateway Protocol (BGP) extended community attribute, and
the plurality of route advertisements including at least one MAC/IP advertisement route,
the at least one MAC/IP advertisement route including one or more second layer 3 labels to be used in connection with performing MPLS to route the network traffic to the destination device;
receive the network traffic to be routed to the destination device; and
route the network traffic toward the destination device via the plurality of edge devices based on the plurality of route advertisements,
the destination device being associated with a plurality of Ethernet virtual private networks (VPNs) associated with the plurality of edge devices,
a first portion of the network traffic being forwarded to a first edge device of the plurality of edge devices and a second, different portion of the network traffic being forwarded to a second edge device of the plurality of edge devices to perform load balancing of the network traffic,
the network traffic being divided based on capacities associated with the first edge device and the second edge device.

9. The non-transitory computer-readable medium of claim 8, where the one or more first layer 3 labels and the one or more second layer 3 labels identify respective lookup tables based on which the plurality of edge devices are to identify next-hop information for the destination device.

10. The non-transitory computer-readable medium of claim 9, where the network traffic includes an Internet Protocol (IP) address associated with the destination device; and
where the plurality of edge devices are to identify the next-hop information based on the IP address.

11. The non-transitory computer-readable medium of claim 8, where the destination device is homed to each of the plurality of edge devices.

12. The non-transitory computer-readable medium of claim 11, where the one or more instructions, when executed the one or more processors, further cause the one or more processors to:
distribute the network traffic across the plurality of edge devices associated with the destination device based on labels associated with the plurality of edge devices.

13. The non-transitory computer-readable medium of claim 8, where the one or more instructions, when executed the one or more processors, further cause the one or more processors to:
identify two or more edge devices of the plurality of edge devices associated with an ethernet segment identifier (ESI); and
determine to load balance the network traffic across the two or more edge devices of the plurality of edge devices associated with the ESI.

14. The non-transitory computer-readable medium of claim 8, where plurality of edge devices are egress devices.

15. A method, comprising: receiving, by a device, a plurality of route advertisements corresponding to a plurality of edge devices,
 the plurality of route advertisements identifying routing information to be used in connection with routing network traffic to a destination device via the plurality of edge devices, and
 the plurality of route advertisements including at least one auto-discovery route,
  the at least one auto-discovery route including one or more first layer 3 labels to be used in connection with performing multiprotocol label switching (MPLS) to route the network traffic to the destination device,
 the plurality of edge devices improving backward compatibility of a route and including:
  the one or more first layer 3 labels in a payload of the route in an auto-discovery by modifying one or more fields of network layer reachability information (NLRI) of the route, and
  an auto-discovery route extended community attribute,
   the auto-discovery route extended community attribute being a Border Gateway Protocol (BGP) extended community attribute, and
 the plurality of route advertisements including at least one MAC/IP advertisement route, the at least one MAC/IP advertisement route including one or more second layer 3 labels to be used in connection with performing MPLS to route the network traffic to the destination device;
receiving, by the device, the network traffic to be routed to the destination device; and
routing, by the device, the network traffic toward the destination device via the plurality of edge devices based on the plurality of route advertisements,
 the destination device being associated with a plurality of Ethernet virtual private networks (VPNs) associated with the plurality of edge devices,
 a first portion of the network traffic being forwarded to a first edge device of the plurality of edge devices and a second, different portion of the network traffic being forwarded to a second edge device of the plurality of edge devices to perform load balancing of the network traffic,
  the network traffic being divided based on capacities associated with the first edge device and the second edge device.

16. The method of claim 15, where the one or more first layer 3 labels and the one or more second layer 3 labels identify respective lookup tables based on which the plurality of edge devices are to identify next-hop information for the destination device.

17. The method of claim 16, where the network traffic includes an Internet Protocol (IP) address associated with the destination device; and
where the plurality of edge devices are to identify the next-hop information based on the IP address.

18. The method of claim 15, where the destination device is homed to each of the plurality of edge devices.

19. The method of claim 15, further comprising:
identifying two or more edge devices of the plurality of edge devices associated with an ethernet segment identifier (ESI); and
determining to load balance the network traffic across the two or more edge devices of the plurality of edge devices associated with the ESI.

20. The method of claim 15, where plurality of edge devices are egress devices.

* * * * *